Jan. 25, 1966  G. SIEBOL  3,230,818
PULL-TYPE BLIND RIVET
Filed May 31, 1963  2 Sheets-Sheet 1
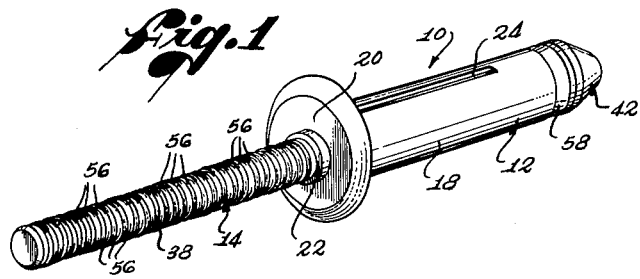
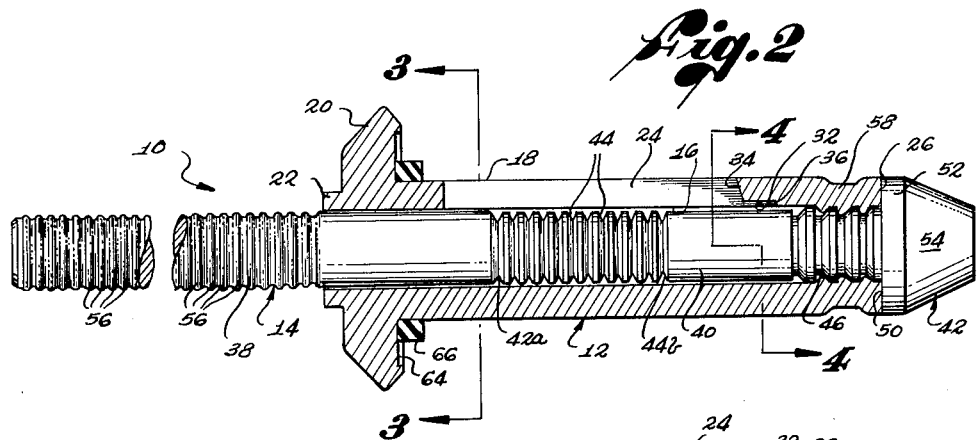
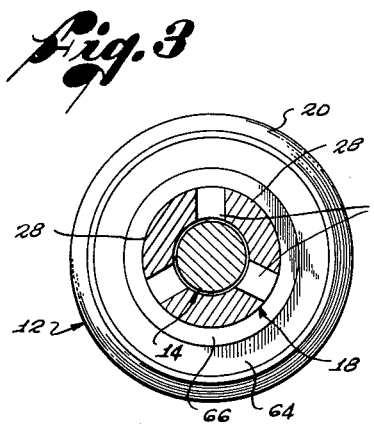
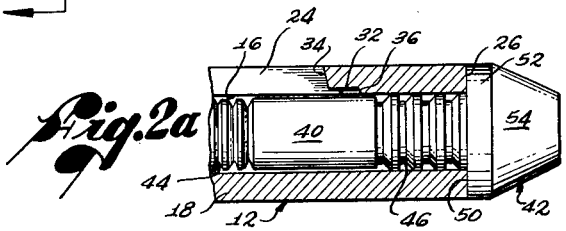
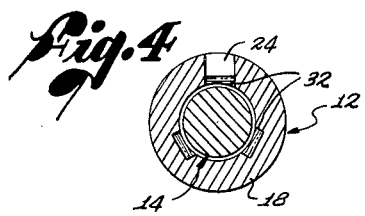
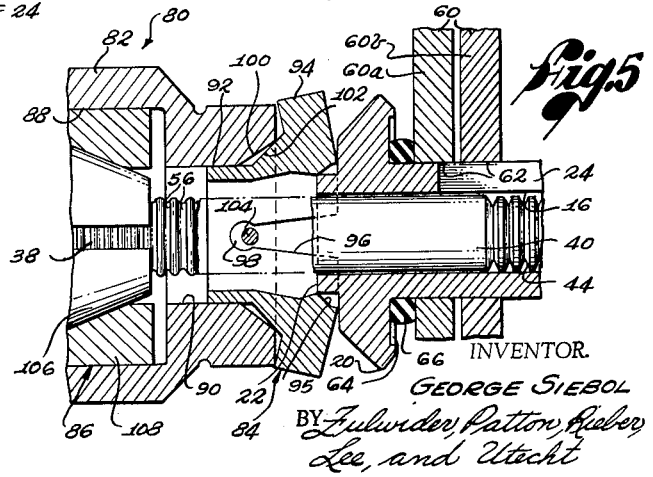
INVENTOR.
GEORGE SIEBOL
BY Fulwider, Patton, Rieber, Lee, and Utecht
ATTORNEYS Jan. 25, 1966  G. SIEBOL  3,230,818
PULL-TYPE BLIND RIVET
Filed May 31, 1963  2 Sheets-Sheet 2
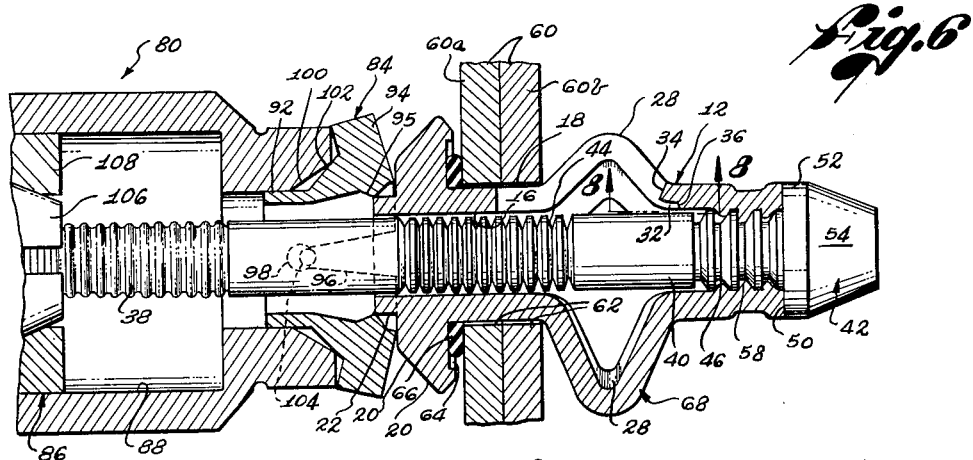
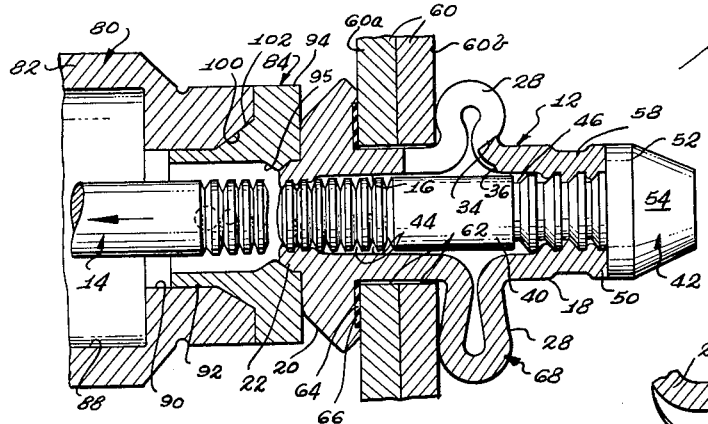
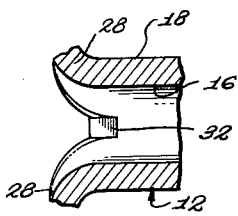
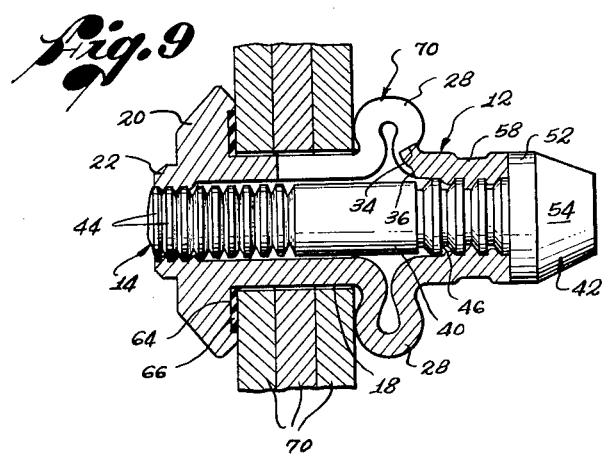
INVENTOR.
GEORGE SIEBOL
BY Fulwider, Patton, Rieber,
Lee, and Utecht
ATTORNEYS

United States Patent Office 3,230,818
Patented Jan. 25, 1966

3,230,818
PULL-TYPE BLIND RIVET
George Siebol, Garden Grove, Calif., assignor to Olympic Screw & Rivet Corporation, Downey, Calif., a corporation of California
Filed May 31, 1963, Ser. No. 284,626
7 Claims. (Cl. 85—71)

This invention relates to rivets and more particularly to an improved pull-type blind rivet.

This application is a continuation-in-part of my co-pending application Serial No. 175,395 entitled High Bearing Blind Rivet and filed February 26, 1962, now Patent No. 3,178,989.

Blind rivets in general find useful application in the riveting of lapped work pieces, where access may be conveniently had by a worker to one side only. In the trade, the accessible side of the work is often referred to as the "top side" and the opposite side as the "blind side," and for convenience these terms are used herein.

Most pull-type blind rivets include two basic parts, namely, a sleeve having a shank and a radially enlarged head, and a pin having a pulling section and a stem. When assembled prior to use, the pin is telescopically received with its stem within the sleeve with its pulling section projecting therefrom. Setting of the rivet, as suggested by the class designation, is achieved by pulling the pin relative to the sleeve outwardly away from the top side of the work.

In conventional use, an assembled pull-type blind rivet is inserted from the top side into substantially aligned apertures in the work pieces. The head of the sleeve is positioned flush with the top side of the work, causing the shank to project on the blind side. An outward pulling force is then applied to the projecting pulling section of the pin and a reactive or restraining force to the head of the sleeve in order to set the rivet. This causes the portion of the shank projecting on the blind side to be radially expanded or "upset" progressively to clinch or clamp the work pieces together. As will be understood, when the rivet is fully set, the work pieces are clamped between the sleeve head on the top side and the radially expanded portion of the shank, or blind head as it is known in the art, on the blind side.

In order to leave a final riveted connection, which is relatively flush with the exposed top side of the work, without having to trim the pin in a separate operation, it is conventional in the art to provide a pin with a weakened section termed a "breakneck" groove. After the shank is upset in the manner described above, resistance to pin travel, and thus tension in the pin, increases under the continued application of the pulling force. The pin is arranged to fracture at the breakneck groove when this tension reaches a predetermined level, whereupon the pulling section of the pin separates from the portion disposed within the sleeve.

In applications where the work pieces comprise low bearing strength sheet material, problems have been encountered in connection with prior pull-type blind rivets. Under the influence of forces tending to separate the work pieces, the apertures tend to open up and allow the radially enlarged end portion of the shank, or blind head, to pull through. This pull through tendency is governed by the area of the blind head bearing on the blind side of the work, the greater the bearing area, the less the unit pressure and, accordingly, the less the tendency for the blind head to pull through. Thus, a successful rivet of the present type for low bearing strength sheet material must be capable of developing a relatively large bearing area of the blind side of the work.

Another problem inherent in most pull-type blind rivets of the prior art is that of pin retention, both before and after setting. It is important when rivets arrive at the job site that they be properly assembled, so as to eliminate the necessity of workmen spending time in assembling them and also to insure proper functioning. Where the rivet parts are not held together by positive means, there is a strong possibility of their separating during transit or handling.

When a pull-type rivet is set, the importance of good pin retention is apparent. If tension in the pin is released after the shank is upset, the tensile strength of the connection is greatly reduced, if not completely destroyed. That is to say, if the pin were released, tensile forces tending to separate the work pieces might very well cause the portion of the shank forming the blind head to contract back to its original shape, permitting the pieces to separate. In this connection, it will be realized that if tension is to be maintained in the pin after setting, it is necessarily locked to the sleeve at both ends of the latter.

In view of the foregoing discussion, it is a primary object of this invention to provide a pull-type blind rivet for affording a greatly improved riveted connection in a wide variety of work piece configurations and thicknesses.

A further and more specific object is to provide a rivet of the type described, which is capable of developing a high bearing area on the blind side of the work during the setting operation, so as to afford a highly satisfactory connection between work pieces comprising low bearing strength sheet material.

Another object of this invention is to provide an improved rivet of the type described, further characterized in that the pin is securely held within the sleeve, both before and after setting.

It is a further object to provide an improved pull-type blind rivet, which bulbs radially outwardly on the blind side of the work during the setting operation to form a plurality of petal-like projections which engage the blind side of the work over a substantial area.

A still further object of this invention is to provide an improved pull-type blind rivet for accomplishing all the foregoing objects, yet which is highly economical from the standpoint that it readily lends itself to mass production and from the standpoint of being quickly and easily set by workmen at the job site.

It is still another object to provide an improved tool for efficiently setting a pull-type rivet constructed in accordance with the invention.

These and other objects, features and advantages of the invention will be better understood by referring to the following detailed description taken in conjunction with the accompanying drawings, in which:

FIGURE 1 is a perspective view of a rivet of the invention, illustrating the associated pin and sleeve in an assembled condition prior to setting;

FIGURE 2 is a view on an enlarged scale illustrating the sleeve in longitudinal section and the pin in side elevation;

FIGURE 2a is a fragmentary view similar to a portion of FIGURE 2, illustrating the rivet parts after assembly but before the sleeve has been swaged to the pin to form a one-piece fastener;

FIGURE 3 is a sectional view taken along line 3—3 of FIGURE 2;

FIGURE 4 is a sectional view taken along line 4—4 of FIGURE 2;

FIGURE 5 is a view partially in longitudinal section and partially in elevation, showing the rivet positioned in a pair of relatively thin work pieces to be joined and with the head portion of a pulling tool positioned for use at the commencement of the setting operation;

FIGURE 6 is an enlarged view similar to FIGURE 5, illustrating the parts during the clinching phase of the setting operation;

FIGURE 7 is an enlarged view similar to FIGURE 5, illustrating the parts at the completion of the setting operation;

FIGURE 8 is a fragmentary sectional view taken along line 8—8 of FIGURE 6; and

FIGURE 9 is an enlarged view similar to FIGURE 7, except that the rivet is shown in a set condition in work pieces having a greater total thickness than in the previous figures.

Referring to the drawings and in particular to FIGURES 1 and 2 thereof, the rivet of the invention, indicated generally by the reference numeral 10, may be seen to comprise a sleeve 12 and a setting pin 14. These basic rivet parts are preferably formed of an aluminum alloy for the reason that such material has good strength, resists corrosion and may be readily formed into the desired shapes. However, it will be understood that satisfactory results may be achieved with a wide variety of other materials.

The sleeve 12 is a tubular member, having a bore 16 of substantially uniform diameter preferably extending from end to end. It includes an elongated and generally cylindrical shank 18 and a radially enlarged head 20 at one end of the shank. In the illustrative case, the head 20 is of the brazier type, although other types of heads may be used effectively in accordance with the invention.

Projecting from the head 20 in a direction opposite the shank 18 is an annular locking crown 22. As will become apparent from the following description, the force required to buckle the crown 22 is an important factor relative to the function of the rivet 10. The resistance of the crown 22 to buckling in turn is controlled for a given material by its wall thickness. Therefore, it will be appreciated that the wall thickness of the crown is varied in accordance with the desired resistance to such buckling.

The shank 18 is formed with a plurality of longitudinally extending and substantially equi-angularly spaced zones of weakness, here comprising three slots 24 arranged at 120° spacing, as illustrated in FIGURES 1, 2, and 3. Each of the slots 24 extends from a point adjacent the head 20 toward, but stopping short of the opposite, terminal end 26 of the shank. The slots 24 afford the shank 18 with a like number of separate tines 28 which are integrally joined at their ends by portions of the shank.

Referring to FIGURES 2 and 4, it may be seen that at the ends of the slots 24 adjacent the terminal end 26 of the shank, each slot joins a relief or groove 32 of equal width in the inner wall of the shank which extends a short distance longitudinally toward that end. The grooves 32 are relatively shallow, each having a depth comprising a minor portion of the wall thickness of the shank. The function of grooves 32 is to permit the tines 28 to bend readily relative to the end portion of the shank 18 and simultaneously spread apart, as in FIGURE 8, during setting of the rivet.

By virtue of the wall thickness of the shank 18 being reduced in the region of the grooves 32, the metal is readily drawn to permit the desired bending and spreading to take place without danger of splitting or breaking off the tines 28. In this respect, the grooves 32 serve an important purpose. Preferably, in order to further enhance the bending and spreading, the end walls 34 and 36 of the slot and groove, respectively, slope slightly toward the terminal end 26 from the outer toward the inner periphery of the shank.

It is observed that under normal circumstances, it is unnecessary to provide grooves similar to the grooves 32 at the opposite ends of the slots 24. During setting of the rivet, as will be described fully below, the end portions of the tines 28 adjacent the sleeve head 20 are disposed and supported within apertures of the work pieces. Therefore, bending of the tines 28 actually takes place about the wall of the aperture adjacent the blind side of the work as a fulcrum and, hence, there is virtually no tendency for the tines to split or break off at that end.

The pin 14 is an elongated and generally cylindrical member and includes, in series, a pulling section 38, a stem 40, and a blind head 42. When the rivet 10 is assembled, as in FIGURES 1 and 2, the stem 40 is disposed within the sleeve 12, and the pulling section 38 and blind head 42 project from the headed and terminal ends of the sleeve, respectively. The maximum outside diameters of the pulling section 38 and stem 40 are preferably just slightly less than the normal inside diameter of the bore 16 (FIGURES 2 and 2a), thereby insuring that the pin 14 may be easily inserted, pulling section first, into the sleeve 12. On the other hand, to enable the assembled rivet to function properly and also to be quickly and easily inserted in the work, the maximum outside diameter of the blind head 42 is preferably substantially equal to but no greater than the outside diameter of the shank 18.

For the purpose of locking the sleeve 12 and pin 14 together at the headed end of the sleeve and to enable the pin to fracture flush with the head 20, a series of annular breakneck-locking grooves 44 are formed in the intermediate portion of the stem 40. These grooves 44 are adapted to receive a portion of the locking crown 22 as the latter is buckled inwardly during the setting operation. Commencing with the groove 44a nearest the pulling section 38 and proceeding toward the blind head 42 of the pin, i.e. from left to right in FIGURE 2, the grooves 44 are successively deeper. Moreover, all grooves 44 are formed so that the pin 14 is of lesser diameter at even the shallowest one (44a) than at any of the remaining grooved or ungrooved portions of the stem 40 and pulling section 38. Therefore, it will be understood that the pin 14 has a weakened section at the groove 44a and has successively weaker sections at each of the remaining grooves 44 toward the bind head 42. The final groove 44b is, of course, the weakest section of the pin.

A second series of grooves 46 are provided in the stem 40 adjacent the blind head 42. The function of grooves 46 is to receive metal of the end portion of the shank 18, which is swaged inwardly during the assembly operation, as illustrated in FIGURE 2, to lock the pin 14 and sleeve 12 together adjacent the terminal end 26 of the latter. Preferably, the grooves 46 are shaped to afford vertically oriented annular shoulders which face toward the blind head 42. These shoulders engage the swaged metal of the shank (FIGURE 2) to securely hold the pin 14 against movement back out of the terminal end 26 of the sleeve.

Movement of the pin 14 on through the sleeve 12 is, of course, prevented by the blind head 42 which has an annular shoulder 50 engaging flush with the terminal end 26 of the shank. In the illustrative embodiment, the head 42 includes a relatively narrow, cylindrically shaped section 52 integral with the stem, and a frustoconical nose 54 for facilitating insertion of the rivet 10 in the apertures of the work pieces to be joined. The diameter of the cylindrical section 52 is substantially equal to the outside diameter of the shank 18.

In order to facilitate the gripping of the pulling section 38 to pull the pin 14, it is formed with a plurality of relatively shallow annular pull grooves 56, as is conventional in the art.

It is desired in order to achieve positive locking of the sleeve 12 and pin 14 to one another, both at the headed and terminal ends of the sleeve, that the metal of the ridges intermediate each of the grooves 44 and 46 have a relatively high unit hardness. This property enables them to withstand axial forces tending to separate the sleeve and pin. Such a desired unit hardness is achieved with the present pin by virtue of the manner in which it is formed. By way of example, in such forming a length of wire is first coldformed in the header to provide a pin having the general shape of the final product, but for the grooves. After cold heading, the grooves 44 and 46 (and 56) are rolled in at their respective positions specified above. Forming them in this manner results in the metal of the ridges intermediate each groove being coldworked and thereby work hardened.

Assembly of the rivet 10 is carried out by inserting the pin 14, pulling section 38 first, into the terminal end 26 of the shank 18. As set forth above and as illustrated in FIGURE 2a, the blind head 42 is positioned in engagement with the terminal end 26. This causes the stem 40 of the pin to be disposed within the sleeve 12 and the pulling section 38 to project exteriorly from the head 20. An annular section 58 of the end portion 30 of the shank is next swaged radially inwardly into locking relationship with the grooves 46 longitudinally aligned therewith to lock the rivet parts together.

Swaging of the sleeve 12 to the pin 14 in the manner specified affords many significant advantages. First, it affords in effect a one-piece fastener. Thus, any possibility of the pin and sleeve separating from one another both before and after the rivet is set is virtually eliminated. Such swaging also has the advantageous effect of coldworking the metal at the end portion of the shank. This, in turn, overcomes any tendency of the end portion to split or open up and, hence, for the rivet to malfunction. Still further, it insures that the load applied to the shank 18 in the setting operation is uniformly distributed.

Setting of the rivet 10 to join a plurality of work pieces may be quickly and easily accomplished. For convenience of description of the setting operation, the rivet 10 is illustrated at progressive stages of setting in FIGURES 5–7 in a pair of work pieces 60 comprising lapped sheets of low bearing sheet material. Apertures 62 are provided in the work pieces which are assumed to be initially separated a small distance (FIGURE 5). It is further assumed that the top side 60a of the work to which access may be conveniently had is to the left in the figures, while the blind side 60b is to the right.

The rivet 10 is positioned for setting by inserting it into the apertures 62, such insertion being facilitated by the frusto-conical nose 54 on the blind head 42 of the pin. The sleeve head 20 is pressed against the top side 58 of the work, causing a substantial portion of the shank 18 to project on the blind side 60b. In order to achieve maximum strength both in shear and tension, the relative diameters of the apertures 62 and shank 18 are such that there is a minimum of free clearance.

In the event that it is desired to seal the riveted connection, an annular groove 64 is provided on the underside of the sleeve head 20 and a resilient, deformable sealing ring 66 is seated partially within the groove 64. As may be seen in FIGURE 2, the ring 66 is shaped so as to initially project outwardly of the groove 64. In the setting operation, the ring is deformed against the top side 60a of the work and into confinement within the groove 64, as indicated in FIGURE 7. To achieve optimum sealing, the volume of the ring 66 is made substantially equal to the void of the groove 64.

With the rivet 10 so positioned, setting is accomplished by applying a pulling force to the pulling section 38 of the pin and a reactive force to the sleeve head 20. By virtue of the section 58 of the shank being swaged into locking relationship with the pin 14 and the blind head 42 engaging the terminal end 26 of the shank, a longitudinal compressive force is transmitted to the shank 18. As a consequence, the unsupported portions of the tines 28 projecting on the blind side of the work begin bulbing radially outwardly into a plurality of petal-like projections in the manner illustrated in FIGURE 6.

The slots 24 enable bulbing to take place without an excessive pulling force having to be applied. Moreover, the grooves 32 at the ends of the slots 24 permit the individual tines 28 to readily bend relative to the tubular end portion of the shank and to spread apart in a manner shown in FIGURE 8 without danger of splitting or breaking off. It may be seen in FIGURE 6 that immediately adjacent the blind side of the work the tines 28 bend about the edge of the aperture 62 as a fulcrum with the ends of the tines being supported therein.

During this initial stage of the setting operation, the work pieces 60 are clamped together between the sleeve head 20 on the top side and a blind head 68 which is then being formed by the tines 28 on the blind side. It is observed parenthetically that at the stage of bulbing, indicated in FIGURE 6, the sealing ring 66 is only partially formed, and thus the head 20 itself does not actually contact the top side 60a of the work.

As the bulbing continues toward the condition shown in FIGURE 7, the tines 28 engage the blind side 60b of the work at locations radially outwardly of the apertures 62. This results in a substantial bearing area being afforded on the blind side of the work. When the setting operation has progressed to the stage shown in FIGURE 7, each of the tines 28 is folded substantially back on itself to afford a blind head 68 a substantial area. The work pieces are then forcefully clamped together between the sleeve head 20 and the blind head 68, the sealing ring 66 now having been formed completely into confinement within the groove 64. Upon the bulbing having progressed to this extent, a very substantial increase to resistance to pin movement is encountered. Because of this, the tension in the pin 14 and compression in the sleeve 12 both correspondingly increase. Responsive to the force reaching a predetermined level, greater than that required to effect bulbing in the desired manner, relative movement of the pin 14 ceases, and the locking crown 22 buckles into longitudinally aligned ones of the grooves 44, as illustrated in FIGURE 7.

Once the locking crown 22 has been buckled into the grooves 44, tension further increases in the portion of the pin 14 then disposed out of the sleeve 12 and located between the point where the pulling force is applied and the buckled crown 22. This results in fracture of the pin 14 at the groove 44 aligned flush with the crown 22 as soon as the force reaches a predetermined force greater than that required to so buckle the crown. Fracturing of the pin 14 takes place at the desired location, since the particular groove 44 at which the pin fractures is the weakest point in the section over which the increased tension acts. It will be recalled from the foregoing discussion that the grooves 44 are successively deeper proceeding from left to right in the figures and, hence, successively weaker sections are provided at each of the grooves 44a and 44b.

The setting operation is thus completed, and the work pieces 60 are tightly clamped together between the head 20 on the top side and the blind head 68 on the blind side. The pin 14 is securely locked under tension within the sleeve 12. Adjacent the sleeve head 20, the locking crown 22 is buckled into aligned ones of the grooves 44, while on the blind side the section 58 of the shank 18 is swaged into locking relationship with the grooves 46 and, in addition, the blind head 42 of the pin abuts the terminal end 26 of the shank.

The rivet 10 is also advantageous from the standpoint that it has a substantial grip range or, in other words, is capable for accommodating a wide range of thicknesses in the work pieces to be joined. In FIGURE 9, the rivet 10 is shown as set in work pieces 70 having an aggregate thickness or grip length substantially greater than in the case of work pieces 62 illustrated in FIGURES 5–7. Increasing the grip length of the work pieces brings about a corresponding decrease in the pin travel required to form the blind head 68. However, proper functioning of the rivet is assured, since the locking grooves 44 extend over a considerable longitudinal portion of the stem 40. Therefore, certain of the grooves 44 are aligned with the locking crown 22 at the instant it is buckled inwardly. In this latter instance, the pin fractures at one of the grooves 44 located nearer the pulling section 38 of the pin.

A suitable tool 80 for efficiently setting the rivet 10 in the manner discussed above is illustrated in FIGURES 5–7. The required function of the tool 80 is to apply an axial pulling force to the pulling section 38 of the pin 14 and a reactive force to the head 20 so as to pull the pin and set the rivet in the manner discussed above.

The tool 80 includes basically a support housing 82, a split collet 84 for engaging the sleeve head 20 and buckling the locking crown 22, and a chuck assembly 86 for pulling the pin 14. The housing 82 is formed with an axial bore 88 in its rearward portion for slidably receiving the chuck assembly 86. In its forward portion, the housing 82 is necked down and has a bore 90, which is of reduced diameter as compared to bore 88 and which is coaxial with the latter.

The collet 84 comprises a sleeve-like member having its rearward portion 92 receivable in the forward end of the bore 90 and a collar 94 at its forward end adapted to engage the head 20 of the sleeve 12. For engaging the crown 22 and buckling it in the setting operation, an inwardly projecting bead 95 of rounded cross section is provided on the inner periphery of the collet 84. As illustrated in FIGURES 5 and 7, the bed is located at a short distance inwardly of the forward end of the collet so as to engage the crown 22 adjacent its outermost extremity.

Expansion and contraction of the collect 84 between the positions shown in FIGURES 6 and 7 is permitted by forming it with a pair of generally longitudinally extending slots 96 in its wall at diametrically opposed positions. Each of the slots 96 extends rearwardly from the forward end of the collar 94 and terminates in a rounded aperture 98 at a location adjacent but short of the rearward end of the portion 92. The purpose of apertures 98 is to permit repeated expansion and contraction of the collet 84 without its fracturing.

In order that the collet 84 perform its desired function, it is constructed and arranged to assume normally its expanded position (FIGURES 5 and 6) and yieldably resist movement to the contracted position (FIGURE 7). A collet with these properties can easily be afforded by forming it in an appropriate manner. By way of example, the collet 84 is first cut to the desired shape and then spread to its expanded position. Subjecting it to heat treatment while expanded causes it to normally retain that position and to yieldingly resist contraction.

Contraction of the collet 84 to buckle the crown 22 in the setting operation is achieved by providing mating frusto-conical surfaces 100 and 102 on the housing 82 and collect 84, respectively. Because of these surfaces, the collet 84 is caused to contract as it is forced into the bore 90 in the forward portion of the housing. Such movement is yieldably resisted by its spring action, and when the axial force is insufficient to overcome the spring action, the collet assumes the position of FIGURES 5 and 6.

Retention of the collet 84 in assembly with the housing 82 is achieved in the present case by providing a short pin 104 in the forward portion of the housing 82, which projects transversely into at least one of the slots 96 and limits the forward movement of the collet.

The chuck assembly 86 for pulling the pin 14 includes gripping jaws 106 and a concentrically mounted closing and pulling member 108. The assembly 86, as previously noted, is slidably mounted in the bore 88 of the housing and adapted for reciprocal movement from an initial forward operating position, illustrated in FIGURE 5, to a rearward operating position toward the left in that figure.

The forward ends of the gripping jaws 106 and the engaging surface on the member 108 are frusto-conical in shape. Therefore, when an axial pulling force is applied to the member 108, the jaws 106 are clamped inwardly toward one another to grip and pull the pin. Preferably, the inner walls of the jaws 106 are grooved to mate with the grooves 56 on the pulling section 38 of the pin 14, so as to insure against slippage. Any suitable actuating mechanism of various types conventionally used may be connected to the chuck assembly 86 for actuating it.

Assuming the rivet 10 to have been positioned properly in the work pieces to be joined, the tool 80 is used to set the rivet 10 by first positioning it over the pulling section 38 of the pin, as illustrated in FIGURE 5. The collet 84 is brought to rest against the head 20 of the sleeve 12 outside of the locking crown 22. Such positioning can be quickly and easily accomplished, since the collet 84 at this stage is in its expanded position. The pulling section 38 of the pin may be seen to project through the collet 84 and into the chuck assembly 86 where it may be gripped for pulling.

The chuck assembly 86 is next actuated to move to the left in FIGURE 5, toward the position of FIGURE 6, to apply the required pulling force to the pin 14 and reactive force to the head 20 of the sleeve 12. As the force increases, the collet 84 is moved bodily into the bore 90 in the housing 82 in opposition to its spring action and simultaneously contracted forcefully about the locking crown 22. As discussed in detail above, when the force applied to the crown 22 exceeds its design strength, it buckles into aligned ones of the grooves 44 on the pin, such buckling being arranged to take place when the shank is fully upset to form the blind head 68. The spring force of the collet 84 is controlled so that ample resistance is afforded to insure that the crown is not forced inwardly prematurely to pinch the pin or otherwise impede its desired movement. By the same token, the resistance is not so great as to prevent the crown from being buckled when the blind head 68 is fully formed.

Application of further force by the tool 80 causes the pin 14 to fracture at the groove 44 aligned with the head 20 to separate its projecting portion (and the tool) from the fully set rivet. When this takes place, the chuck assembly 86 is free to spring back to its original forward position (FIGURE 5) to eject the broken off section of the pin. Since the axial thrust against the collet 84 is also released, it springs back to its expanded position, thereby readying the tool 80 for subsequent operation.

The tool 80 is not only highly satisfactory in accomplishing its intended function, but is also economical from several standpoints. As may be seen, it is extremely simple in construction, embodying relatively few parts and, hence, inexpensive to manufacture. In addition, it is constructed so as to be quickly positioned and actuated by a workman to set the rivet 10 and, therefore, is economical of labor costs.

Although one embodiment of the rivet of the invention and of the tool for setting the same have been illustrated and described in considerable detail, it will be understood that various changes in the details of the constructions and arrangements of the various parts may be made without departing from the spirit and scope of the invention, as defined by the appended claims.

I claim:

1. A blind rivet adapted to be inserted from the top side and set in aligned apertures in a plurality of work pieces, comprising:
   a tubular sleeve including a shank with a plurality of angularly spaced and longitudinally extending slots that afford it with a like number of tines, and a radially enlarged head at one end of said shank, each of said slots extending longitudinally in said shank from a point adjacent said sleeve head and terminating adjacent the opposite end in a longitudinally aligned groove which extends longitudinally along said shank from its respective slot to a point short of said opposite end and has a width approximately equal to that of its respective slot and a length which is relatively short in relation to the length of its slot, said sleeve being adapted to be inserted into the aligned apertures in said work pieces with said head abutting the top side and with a portion of said shank projecting from the opposite blind side of the same, the tines on the projecting portion of said shank bulbing radially outwardly to form petal-like projections which pressurally engage the blind side of the work pieces at locations radially outwardly of said apertures, responsive to a longitudinal compressive force being transmitted to said opposite end of said shank;

a pin including a stem initially disposed within said sleeve and a pulling section projecting from the headed end of said sleeve, means operatively connecting said stem to said shank longitudinally outwardly of said groove so that an axial compressive force is transmitted to said opposite end of said shank upon an axial pulling force being applied to said pulling section and an opposite reactive force being applied to said head;

and means in said sleeve head and said pin for locking said sleeve and pin together after such bulbing of said tines.

2. The subject matter of claim 1 further characterized in that the depth of each of said grooves comprises a minor portion of the wall thickness of said sleeve.

3. A blind rivet adapted to be inserted from the top side and set in aligned apertures in a plurality of work pieces, comprising:

a tubular sleeve including a shank with a plurality of angularly spaced and longitudinally extending slots that afford it with a like number of tines, and a radially enlarged head at one end of said shank with a locking crown therein projecting oppositely from said shank and adapted to buckle inwardly, each of said slots extending longitudinally in said shank from a point adjacent said sleeve head and terminating adjacent the opposite end in a longitudinally aligned groove in the inner wall of said shank which extends longitudinally along said shank from its respective slot to a point short of said opposite end and has a width approximately equal to that of its respective slot and a length which is relatively short in relation to the length of its slot, said sleeve being adapted to be inserted into the aligned apertures in said work pieces with a portion of said shank projecting from the opposite blind side of the same;

and a pin including a stem initially disposed within said sleeve, means operatively connecting said stem to said shank longitudinally outwardly of said groove for transmitting a longitudinally compressive force to said shank and a pulling section projecting exteriorly from the headed end of said sleeve, said stem being formed adjacent said pulling section with a plurality of annular locking grooves, the tines on said projecting portion bulbing radially outwardly to form petal-like projections which pressurally engage the blind side of the work pieces at locations radially outwardly of said apertures, responsive to a longitudinal compression force being transmitted to said opposite end of said shank, said stem having said locking grooves located so that at least one said groove will lie within said locking crown when said locking crown buckles to lock said sleeve to said pin.

4. A blind rivet adapted to be inserted from the top side and set in aligned apertures in a plurality of work pieces, comprising:

a tubular sleeve including a shank with three substantially equi-angularly spaced and longitudinally extending slots that afford it with a like number of tines, and a radially enlarged head at one end of said shank with a locking crown on said head projecting oppositely from said shank and adapted to buckle inwardly, each of said slots extending longitudinally from a point adjacent said sleeve head and terminating adjacent the opposite end of said shank in a longitudinally aligned groove which extends longitudinally along said shank from its respective slot to a point short of said opposite end and has a width approximately equal to that of its respective slot and a length which is relatively short in relation to the length of its slot, said sleeve being adapted to be inserted into the aligned apertures in said work pieces with a portion of said shank projecting from the opposite blind side of the same;

and an integral pin including a stem initially disposed within said sleeve, a pulling section projecting exteriorly from the headed end of said sleeve, and a blind head projecting exteriorly from, and engageable with the opposite blind end of said shank, means operatively connecting said stem to said shank longitudinally outwardly of said grooves, said stem being formed adjacent said pulling section with a plurality of first locking grooves located so that at least one said groove will lie within said locking crown when said locking crown buckles inwardly, and having a plurality of second locking grooves adjacent said blind head, the latter of which receive an annular portion of said shank located adjacent said opposite end and swaged radially inwardly into locking relationship with said stem, the tines on the projecting portion of said shank bulbing radially outwardly to form three petal-like projections which pressurally engage the blind side of the work pieces at locations radially outwardly of said apertures, responsive to a longitudinal compressive force being transmitted to said opposite end of said shank, and when the forces reach a predetermined level greater than that required to so form said projections, said locking crown buckling into a longitudinally aligned one of said first locking grooves.

5. A blind rivet adapted to be inserted from the top side and set in aligned apertures in a plurality of work pieces, comprising:

a tubular sleeve including a shank of a given wall thickness with a plurality of angularly spaced and longitudinally extending zones of weakness that afford it with a like number of tines, and a radially enlarged head at one end of said shank, each of said zones of weakness extending longitudinally in said shank from a point adjacent said sleeve head and terminating in a relief zone which is approximately as wide as its respective zone of weakness and has a wall thickness less than said given wall thickness and greater than the wall thickness at said zones of weakness and which stops short near the opposite end of said shank, said sleeve being adapted to be inserted into the aligned apertures in said work pieces with said head abutting the top side and with a portion of said shank projecting from the opposite blind side of the same, the tines on the projecting portion of said shank bulbing radially outwardly to form petal-like projections which pressurally engage the blind side of the work pieces at locations radially outwardly of said apertures, responsive to a longitudinal compressive force being transmitted to said opposite end of said shank;

a pin including a stem initially disposed within said sleeve and a pulling section projecting from the headed end of said sleeve, means operatively connecting said stem to said shank longitudinally outwardly of said relief zone so that an axial compressive force is transmitted to said opposite end of said shank upon a force being applied to said pulling section and an opposite reactive force being applied to said head;

and means in said sleeve head and said pin for locking said sleeve and pin together after such bulbing of said tines.

6. A blind rivet adapted to be inserted from the top side and set in aligned apertures in a plurality of work pieces, comprising:

a tubular sleeve including a shank with a plurality of angularly spaced and longitudinally extending slots that afford it with a like number of tines, and a radially enlarged head at one end of said shank with a locking crown projecting oppositely from said shank, and adapted to be buckled inwardly, each of said slots extending longitudinally in said shank and terminating in a groove which is continuous with its associated slot and has a width approximately equal to its associated slot, said sleeve being adapted to be inserted into the aligned apertures in said work pieces with said head abutting the top side and a portion of said shank projecting from the opposite blind side of the same, the tines on the projecting portion of said shank bulbing radially outwardly to form petal-like projections which pressurally engage the blind side of the work pieces at locations radially outwardly of said apertures, responsive to a longitudinally compressive force being transmitted to said opposite end of said shank;

a pin including a stem initially disposed within said sleeve, a pulling section integral with said stem and projecting from the headed end of said sleeve, and a blind head integral with said stem with means for engaging the opposite blind end of said shank and projecting from the opposite blind end of said shank, said pin being arranged to transmit an axial compressive force to said opposite end of said shank, said stem being formed with a plurality of locking grooves for receiving said locking crown as the latter is buckled inwardly to lock said pin to said sleeve.

7. A blind rivet adapted to be inserted from the top side and set in aligned apertures in a plurality of work pieces, comprising:

a tubular sleeve including a shank with a plurality of angularly spaced and longitudinally extending slots that afford it with a like number of tines, and a radially enlarged head at one end of said shank with a locking crown therein projecting oppositely from said shank and adapted to buckle inwardly, each of said slots extending longitudinally in said shank from a point adjacent said sleeve head and terminating adjacent the opposite end in a longitudinally aligned groove in the inner wall of said shank which is relatively short in relation to the length of its slot and which stops short of the opposite end of said shank, an end wall of each of said slots at their junction with said grooves and an end wall of each of said grooves sloping slightly toward said opposite end of said shank from the outer toward the inner wall of said shank, said sleeve being adapted to be inserted into the aligned apertures in said work pieces with a portion of said shank projecting from the opposite blind side of the same;

and a pin including a stem initially disposed within said sleeve and operatively connected to the shank at the end thereof opposite said head for transmitting a longitudinally compressive force thereto and a pulling section projecting exteriorly from the headed end of said sleeve, said stem being formed adjacent said pulling section with a plurality of annular locking grooves, the tines on said projecting portion bulbing radially outwardly to form petal-like projections which pressurally engage the blind side of the work pieces at locations radially outwardly of said apertures, responsive to a longitudinal compressive force being transmitted to said opposite end or said shank, said stem having said locking grooves located so that at least one said groove will lie within said locking crown when said locking crown buckles to lock said sleeve to said pin.

References Cited by the Examiner

UNITED STATES PATENTS

| | | | |
|---|---|---|---|
| 2,030,167 | 11/1936 | Miller | 85—70 |
| 2,061,628 | 11/1936 | Huck | 85—70 |
| 2,341,598 | 2/1944 | Crowley | 85—71 |
| 2,466,811 | 4/1949 | Huck | 85—78 |
| 2,913,953 | 11/1959 | Tendler | 85—71 |
| 3,055,255 | 9/1962 | Burrell | 85—71 |

FOREIGN PATENTS 209,951    8/1957    Australia.

EDWARD C. ALLEN, *Primary Examiner.*

C. B. ELDERKIN, *Assistant Examiner.*